United States Patent [19]

Masoero et al.

[11] Patent Number: 4,838,603
[45] Date of Patent: Jun. 13, 1989

[54] DEVICE FOR PREVENTING THE REAR LIGHT UNITS OF MOTOR VEHICLES FROM BECOMING DIRTY

[75] Inventors: Marco Masoero, Fiano; Angelo Garrone, Cascine Vica-Rivoli, both of Italy

[73] Assignee: Fiat Auto S.p.A., Turin, Italy

[21] Appl. No.: 156,635

[22] Filed: Feb. 17, 1988

[30] Foreign Application Priority Data

Feb. 17, 1987 [IT] Italy .................. 67109 A/87

[51] Int. Cl.⁴ .................. B62D 35/00; B60Q 1/00
[52] U.S. Cl. .................. 296/180.1; 296/208; 362/80
[58] Field of Search .................. 296/1 S, 208; 362/80

[56] References Cited

U.S. PATENT DOCUMENTS

| | | | |
|---|---|---|---|
| 3,563,598 | 2/1971 | Wilfert et al. | 296/1 S |
| 3,635,517 | 1/1972 | Wilfert et al. | 296/208 |
| 3,653,709 | 4/1972 | Gravett | 296/1 S |
| 3,768,582 | 10/1973 | Phillippe | 296/1 S X |
| 3,892,439 | 7/1975 | Götz | 296/208 X |
| 4,159,845 | 7/1979 | Bratsberg | 296/1 S X |
| 4,268,892 | 5/1981 | Pfeiffer et al. | 296/1 S X |

Primary Examiner—Dennis H. Pedder
Assistant Examiner—John M. Gruber
Attorney, Agent, or Firm—Sughrue, Mion, Zinn, Macpeak & Seas

[57] ABSTRACT

Air intakes, usually constituted by N.A.C.A. intakes, are formed in the sides of the motor vehicle immediately in front of each rear light unit. When the vehicle is moving, each of the intakes induces a flow of air towards the light unit. As it passes through flow-conditioning means, such as a deflector element mounted in a corner position on the light unit or a slot-like duct which passes through the light unit, this flow is transformed into a turbulent air flow. As it spreads into the space surrounding the surface of the light unit and/or flows over it, this air flow prevents the deposition of dirt on the light unit.

3 Claims, 2 Drawing Sheets

DEVICE FOR PREVENTING THE REAR LIGHT UNITS OF MOTOR VEHICLES FROM BECOMING DIRTY The present invention relates to devices which prevent the rear light units of motor vehicles from becoming dirty.

BACKGROUND OF THE INVENTION

During travel on dusty roads or in rainy or snowy weather conditions, dirt, such as dust and mud, tends to collect very rapidly on the rear light units of motor vehicles. This dirt considerably reduces the brightness of the light units, making it more difficult for them to be detected from following motor vehicles.

In order to remedy this problem, whih is particularly apparent in motor vehicles with a substantially flat rear panel, mechanical light-wipers substantially similar to those fitted to the front light units of some motor vehicles could be adopted, in principle.

Some manufacturers have also suggested that the optical surfaces of rear light units be made with a particular stepped conformation which tends to reduce the effect of dirt to some extent.

Up to now, however, no solution has been suggested which enables the dirtying of the rear light units of motor vehicles to be prevented completely without giving rise to problems in terms of complexity and cost.

SUMMARY OF THE INVENTION

The object of the present invention is to provide such a solution, by virtue of a device for preventing, during travel, the deposition of dirt on a motor vehicle rear light unit situated generally in a corner position between one side and the rear panel of the body of the motor vehicle, characterised in that it includes:

an air intake formed in the side adjacent the light unit and able, when the vehicle is moving, to induce a flow of air towards the light unit, and flow-conditioning means associated with the light unit and situated fluidodynamically downstream of the air intake so as to generate, from this air flow and in the space surrounding the light unit, a turbulent air flow which prevents the deposition of dirt on the light unit.

The air intake is preferably constituted by a N.A.C.A. air intake which is completely recessed (sunken) into the outer surface of the side of the motor vehicle body.

The flow-conditioning means may be constituted by a deflector element having a generally dihedral configuration with first and second limbs facing the side and the rear panel of the motor vehicle body respectively, so that the turbulent air flow is directed substantially along the rear panel and flows at least partly across the light unit.

According to a possible variant, the flow-conditioning means comprise at least one air-flow duct which extends between the air intake and the rear panel with at least one portion of the light unit being situated outwardly of the motor vehicle relative to the air-flow duct. In this case, at its end facing the rear panel of the motor vehicle body, the duct may have nozzle means which project the tubulent air flow longitudinally of the vehicle.

BRIEF DESCRIPTION OF THE DRAWINGS

The invention will now be described, purely by way of non-limiting example, with reference to the appended drawings, in which.

DETAILED DESCRIPTION OF THE INVENTION

Figure 1:
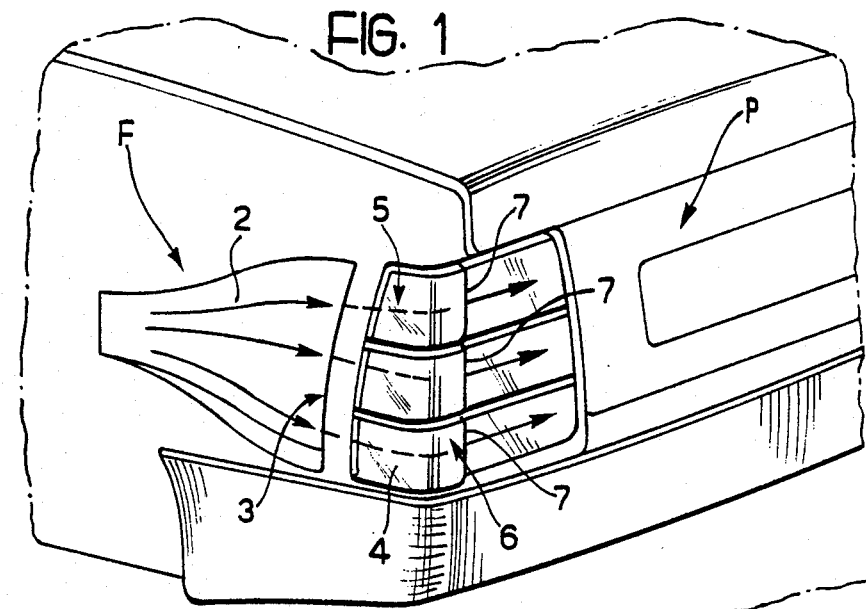
FIG. 1 is a first perspective view of a rear light unit of a motor vehicle embodying the device according to the invention.

All five of the appended drawings show a rear corner part of the body of a motor vehicle, such as a car A, not illustrated in its entirety.

One of the rear light units 1 of the motor vehicle is mounted at the corner.

In general, it can be stated that the light unit 1 is mounted generally in a corner position between a respective side F and the rear panel P of the motor vehicle body.

In all three embodiments of the invention illustrated in the drawings, an air intake formed in the side F immediately in front (in the normal direction of travel of the motor vehicle) of the light unit 1 is indicated More precisely, this consists of an air intake of the type currently known as N.A.C.A. intake whose use is well known in the aeronautical field.

The characteristic of the intake 2 is that it is made so as to be sunken, that is, completely recessed relative to the outer surface of the side F of the motor vehicle body. In other words, the presence of the intakes 2 (two in number, one for each side of the motor vehicle) does not involve any increase in the main section of the motor vehicle.

When the vehicle is moving, the intake 2 generates an air flow towards the light unit 1 at its widened outlet region 3 situated closely adjacent the light unit 1.

Figure 2:
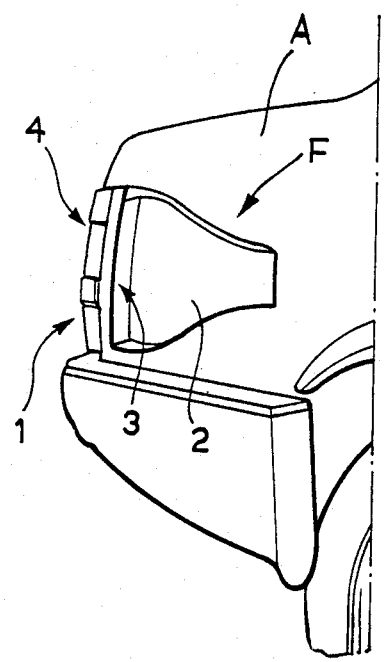
FIGS. 2 and 3 are further perspective views of the light unit of FIG. 1, and FIGS. 4 and 5 show respective variants of the solution according to the invention.
Figure 3:
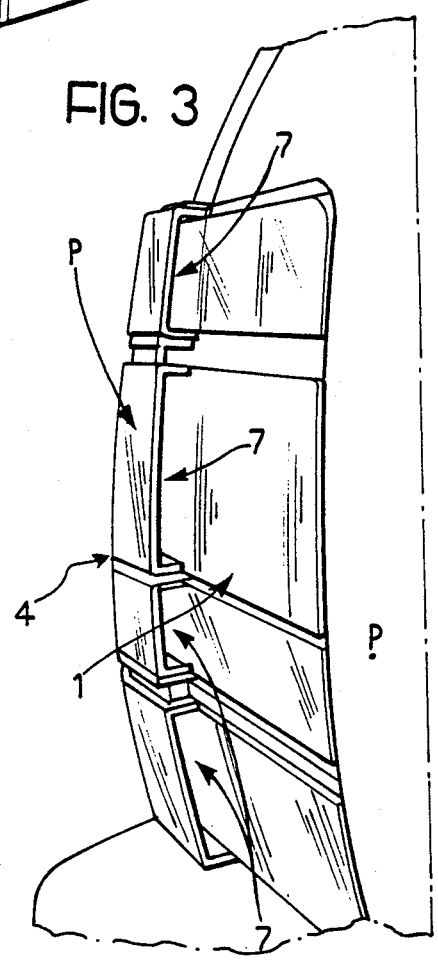

FIGS. 1 to 3 relate to a possible embodiment of the invention for cars of the LANCIA THEMA or FIAT CROMA (both being trademarks) type. In this case, the light unit 1 is provided with an appendage 4 (made of transparent material which is identical—even as regards any division into horizontal strips of different colours—to the material constituting the so-called glass of the light unit) constituting a dihedral deflector situated in a corner position relative to the body.

More precisely, the deflector 4 has a generally dihedral configuration in which can be distinguished a first limb 5 facing the outer surface of the side F (and coplanar therewith) and a second limb 6 facing the rear panel P and slightly spaced from the general plane of the rear panel P (as can better be seen in the view of FIG. 3).

The deflector 4 thus defines within it a flow duct connected at its upstream end to the outlet region 3 of the air intake 2 and provided with outlet openings 7 which open onto that face of the light unit 1 which extends on the rear panel P of the body.

The function of the deflector element 4, which is situated fluidodynamically downstream of the intake 2, is to convert the air flow induced by the intake 2 into a turbulent air flow which emerges from the openings 7 and flows across the surface of the light unit 1 which is on the rear panel P of the body.

When the vehicle is moving, the presence of this turbulent air flow in the space surrounding the light unit 1 means that dirt (dust, mud, etc.) which tends to be deposited on the rear panel P of the motor vehicle, particularly when the latter has a substantially flat conformation, is repelled from the region of the rear lights 1, which are thus kept substantially clean.

Experimental tests conducted by the Applicants have shown that, in addition to the effect described, the presence of the air intakes 2 at the rear ends of the sides of the motor vehicle also has the effect of increasing the longitudinal aerodynamic stability of the motor vehicle, making it less subject to slewing induced by any gusts of cross-wind.

Figure 4:
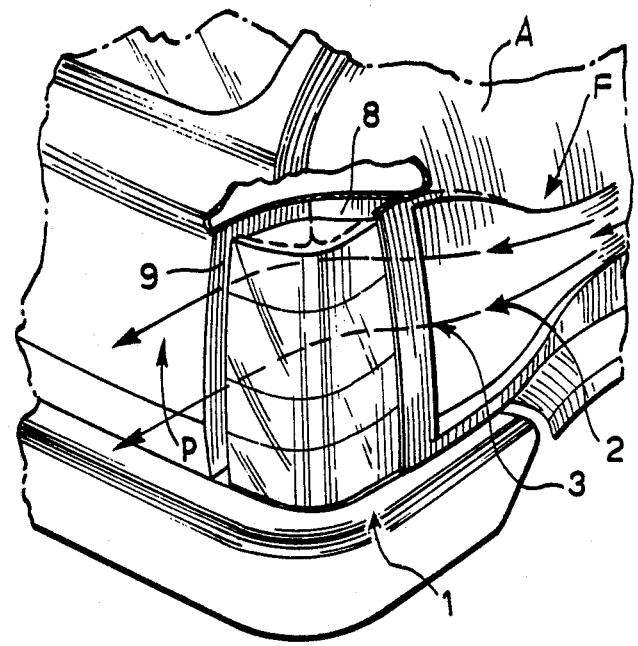
Figure 5:
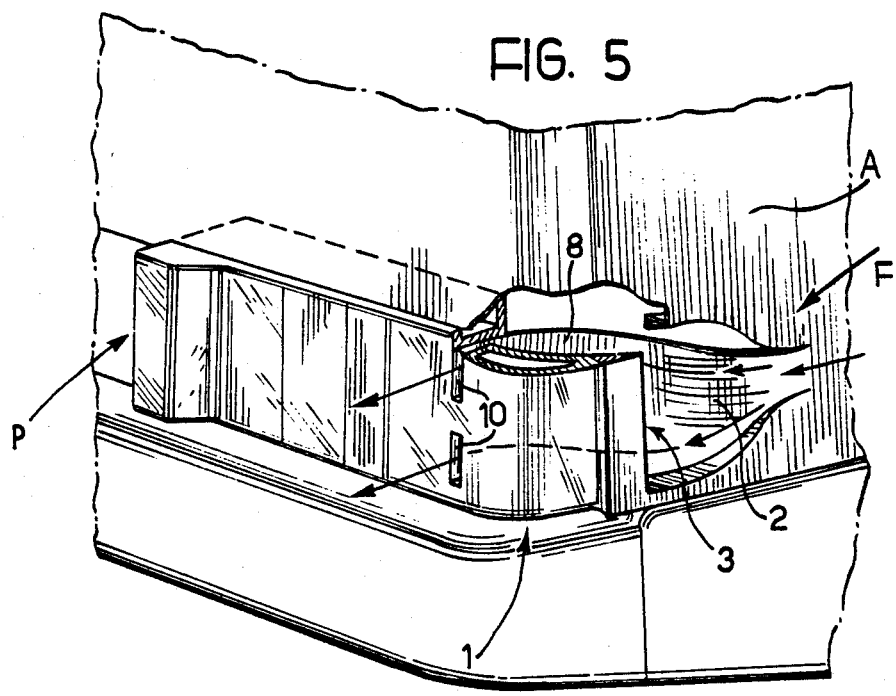

The variants illustrated in FIGS. 4 and 5 differ from the solution shown in FIGS. 1 to 3 in that the air flow generated at the outlet of the intake 2, instead of being deflected in a direction generally around the outer surface of the light unit 1, is deflected into a flow duct 8 which extends inwardly of the light unit (FIG. 4), or at least of a portion thereof (FIG. 5).

In both cases, therefore, the duct 8 extends from the outlet end 3 of the air intake 2 towards the rear panel P, leaving at least one portion of the light unit 1 in a position outside the flow duct 8 (relative to the body of the motor vehicle).

In the embodiment illustrated in FIG. 4, which relates to a rear light unit 1 of the type currently fitted to FIAT PANDA cars, the duct 8 assumes the appearance of an actual slot which passes around the inside of the light unit 1 and opens onto the rear panel P through a vertical slot 9.

In the embodiment of FIG. 5, which relates to a rear light unit 1 of the type currently fitted to AUTOBIANCHI Y10 cars, the duct 8 passes around the inside of only part of the light unit 1 and opens onto the rear panel P through two holes 10 provided in that face of the light unit which is aligned with the rear panel P.

In both cases, the slot 9 or the holes 10 constitute nozzles which project the turbulent air flow, generated when the vehicle is moving, in a longitudinal direction relative to the motor vehicle. In this case also, the turbulent air flow spreads into the space surrounding the light unit 1 to prevent the deposition of dirt on the light unit.

We claim:

1. A device for preventing, during travel, the deposition of dirt on a rear light unit of a motor vehicle situated generally in a corner position between a side panel and a rear panel of the body of the motor vehicle with a light transmitting portion of the unit extending along the side panel and the rear panel including:

an air intake recessed into a surface of the side panel adjacent the light unit and capable of inducing an air flow towards the light unit when the motor vehicle is moving; and air flow directing means associated with the light unit and situated fluid-dynamically downstream of the air intake so as to direct the air flow in a manner to generate turbulence adjacent the light transmitting portion to prevent the deposition of dirt on the light unit;

wherein said air flow direction means includes at least one air passage extending through the light transmitting portion of said light unit extending along the rear panel.

2. A device as set forth in claim 1, wherein said air passage is defined by a deflector member having a generally dihedral configuration with a first limb and a second limb extending along the side panel and the rear panel of the motor vehicle body respectively, so that the turbulent air flow is directed substantially along the rear panel and passes at least partly across the light transmitting portion of the light unit extending along the rear panel, wherein the first limb of the deflector element is substantially coplanar with the side of the motor vehicle and wherein the deflector element is of light transmitting material and constitutes an integral part of the light transmitting portion of the light unit.

3. A device as set forth in claim 1, wherein said air passage is comprised of at least one hole extending through the light transmitting surface extending along the rear panel and a duct extending behind the light unit and communicating said air intake with said at least one hole.

* * * * *